United States Patent [19]

Abo et al.

[11] Patent Number: 5,065,328
[45] Date of Patent: Nov. 12, 1991

[54] SYSTEM AND METHOD FOR RECOGNIZING TRAFFIC STAGNATION FOR VEHICLE

[75] Inventors: Toshimi Abo; Shuzo Fukuzumi, both of Kanagawa, Japan

[73] Assignee: Nissan Motor Company, Ltd., Yokohama, Japan

[21] Appl. No.: 432,937

[22] Filed: Nov. 7, 1989

[30] Foreign Application Priority Data

Nov. 10, 1988 [JP] Japan .............................. 63-282594

[51] Int. Cl.[5] .............................................. B60K 41/04
[52] U.S. Cl. ........................... 364/426.04; 364/424.01; 364/424.1; 364/431.07; 123/492; 123/493
[58] Field of Search ........... 364/424.1, 431.07, 426.04; 74/865, 877, 866, 867; 123/492, 493

[56] References Cited

U.S. PATENT DOCUMENTS

| 4,643,048 | 2/1987 | Hattori et al. | 74/877 |
| 4,829,435 | 5/1989 | Isono | 364/424.1 |
| 4,852,006 | 7/1989 | Speranza | 364/424.1 |
| 4,866,622 | 4/1989 | Dreher et al. | 364/424.1 |
| 4,889,015 | 12/1989 | Kondo | 364/424.1 |

Primary Examiner—Parshotam S. Lall
Assistant Examiner—V. Trans
Attorney, Agent, or Firm—Pennie & Edmonds

[57] ABSTRACT

A system and method for recognizing a stagnation state for a vehicle are disclosed in which a running characteristic pattern of the vehicle is derived on the basis of running parameters such as the vehicle speed, acceleration of the vehicle, and deceleration of the vehicle, and whether the running characteristic pattern substantially coincides with a running characteristic pattern peculiar to a state in which the vehicle runs in the stagnation state.

19 Claims, 4 Drawing Sheets

SYSTEM AND METHOD FOR RECOGNIZING TRAFFIC STAGNATION FOR VEHICLE

BACKGROUND OF THE INVENTION (1) Field of the invention

The present invention relates to a system and method for recognizing that a vehicle is operating in a traffic stagnation state.

(2) Description of the background art

When the vehicle runs in a traffic stagnation state, it is preferable for an acceleration to be reduced with respect to a depression of (angular displacement of) an accelerator pedal than a normal running state since a driving operation to avoid a collision against a preceding vehicle and to follow behind the preceding vehicle becomes easy and the fatigue of the vehicle driver is, therefore, relieved. Consequently, a safer driving is achieved.

Japanese patent Application First Publication No. Showa 59-200848 published on Nov. 14, 1984 exemplifies a control system for an automatic transmission in which when the vehicle runs in traffic stagnation, the system recognizes it and deviates a shift lever position diagram of the automatic transmission toward a lower gear position at an early stage. In the above-described control system, when an average value of the vehicle speed measured at a regular time interval within a predetermined time and a median value of an accumulated distribution of the acceleration in the vehicle forward direction measured together with the vehicle speed, are below a respective predetermined value, the system determines that the vehicle runs in the traffic stagnation.

However, the recognition of the traffic stagnation is carried out only after some amount of data on the vehicle speed and acceleration have been collected and, hence, the recognition of the traffic stagnation cannot be carried out until some time after the vehicle has started to run.

SUMMARY OF THE INVENTION

It is an object of the present invention to provide a system and method in a vehicle for recognizing a traffic stagnation at an earlier stage of the vehicle's operation in that traffic stagnation.

The present invention is based on the following characteristic pattern of the vehicle's operation, referenced to a preferred embodiment.

In specific, when the vehicle runs normally, the vehicle is initially accelerated with an accelerator pedal depressed to some degree, as shown by a solid line of FIG. 4 so that the vehicle speed is sufficiently raised. Thereafter, the vehicle cruises with a depression angle of the accelerator pedal returned some degree toward a zero position. Sometimes, though, the acceleration is halted and the vehicle is decelerated by a deceleration operation, such as a returning operation of the accelerator pedal, and depression of a brake pedal before the vehicle speed is raised to a point which corresponds to the depression angle of the accelerator pedal, as shown in a broken line of FIG. 4. Such acceleration and deceleration operations are frequently repeated during traffic stagnation. In addition, such repeated operations do not appear during the normal running of the vehicle.

In view of the characteristic pattern of the vehicle run described above, with reference to FIG. 4, the above-described object can be achieved by providing a system for recognizing a traffic stagnation state for a vehicle, comprising: a) first means for detecting a vehicle speed; b) second means for deriving a vehicle acceleration; c) third means for deriving a vehicle deceleration; and d) fourth means for deriving a vehicle running pattern on the basis of the vehicle speed, vehicle acceleration, and vehicle deceleration and determining whether the derived vehicle run pattern substantially coincides with a vehicle running pattern peculiar to a state in which the vehicle runs in a traffic stagnation.

The above-described object can also be achieved by providing a method for recognizing a traffic stagnation state, comprising the steps: a) detecting a vehicle speed; b) deriving a vehicle acceleration; c) deriving a vehicle deceleration; and d) deriving a vehicle running pattern on the basis of the vehicle speed, vehicle acceleration, and vehicle deceleration and determining whether the derived vehicle run pattern substantially coincides with a vehicle running pattern peculiar to a state in which the vehicle runs in a traffic stagnation.

DETAILED DESCRIPTION OF THE PREFERRED EMBODIMENTS

Reference will hereinafter be made to the drawings in order to facilitate a better understanding of the present invention.

Figure 1:
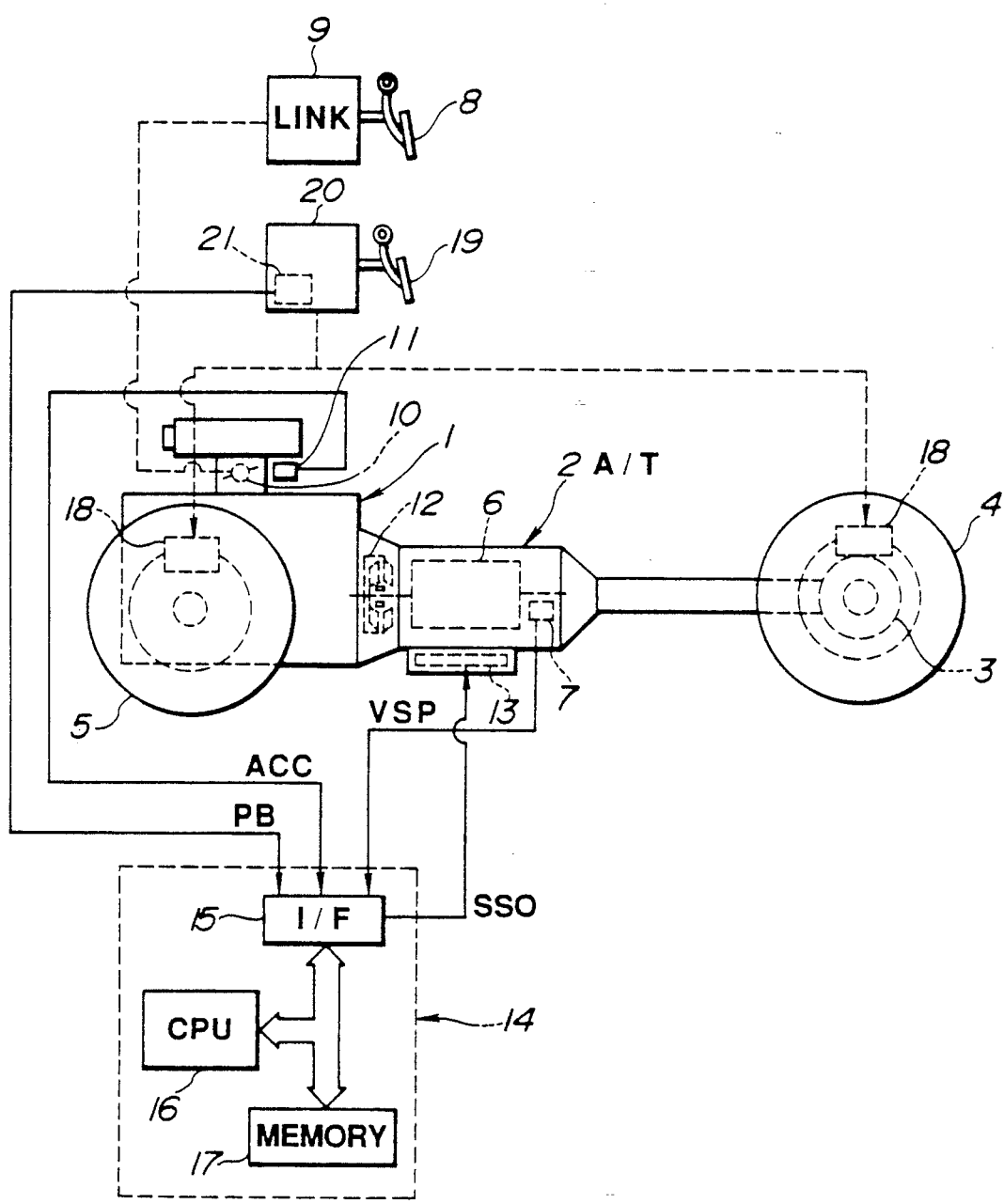
FIG. 1 is a simplified circuit block diagram of a system for recognizing a traffic stagnation in a first preferred embodiment according to the present invention.

FIG. 1 shows a configuration of a system for recognizing a traffic stagnation in a first preferred embodiment according to the present invention mounted in a vehicle.

In FIG. 1, the vehicle includes an engine 1, an automatic transmission 2, a differential gear 3, and a driving wheel 4.

The engine 1 is provided with an engine control microcomputer. The microcomputer receives a signal derived from a vehicle speed sensor 7 detecting a vehicle speed VSP from a rotational speed of an output shaft of a speed change gear mechanism 6 of the automatic transmission 2 and a signal derived from a throttle sensor 11 for detecting an opening angle TH of a throttle valve 10 which opens and closes an intake air passage of the engine 1 according to a depression of an accelerator pedal 8 via a link mechanism 9 in addition to other signals derived to indicate an engine revolutional speed and engine intake air quantity. The microcomputer on the basis of these engine information signals outputs a fuel injection quantity signal and ignition timing angle signal to the engine 1. The engine 1 is operated on the basis of such control signals and is driven at an output determined according to the depression (operating variable) of the accelerator pedal 8.

The automatic transmission 8 is provided with a torque converter 12 in series with the speed change gear mechanism 6. Engine output revolution is inputted to the speed change mechanism 6 via the torque converter 12 and outputted with the speed change in the increase direction and/or decrease direction according to a selected gear ratio established in the speed change mechanism 6.

It is noted that the speed change mechanism 6 incorporates various types of friction elements such as clutches or brakes to determine a gear ratio with the frictional elements selectively and hydraulically operated by means of a line pressure. In addition, the speed change mechanism 6 carries out a ratio change toward another gear ratio by means of the operated frictional element. Then, output revolutions of the speed change gear mechanism 6 is transmitted to the driving wheel 4 via the differential gear 3 to run the vehicle.

A hydraulic circuit 13 having a plurality of shift solenoids and a transmission control computer 14 are included in the automatic transmission 2 in order to perform a change speed control for the speed change mechanism 6. The speed change microcomputer 14 receives the signals derived from the vehicle speed sensor 7 and throttle sensor 11 and reads them into a CPU (Central Processing Unit) 16 via an interface (I/F) 15. The CPU 16 references a speed change diagram indicating a speed change gear range determined according to the vehicle speed value VSP written into a memory 17 and operating variable ACC of the accelerator pedal 8 to determine a gear ratio. The CPU 16 outputs a signal SSO to one of shift solenoids of the hydraulic circuit 13 via the I/F 15 so that the shift solenoids are selectively turned on and off. The combination of the on-and-off of the shift solenoid causes the line pressure to the various types of the frictional elements to be selectively supplied in order to select the gear ratio determined.

Furthermore, the speed change control computer 14 recognizes that the vehicle runs in the traffic stagnation and processes in such a way as to select one of a plurality of speed change diagrams within the memory 17 which is appropriate to the run in the traffic stagnation.

The microcomputer 14 receives a signal derived from a brake sensor 21, the brake sensor 21 detecting a brake pressure PB of a brake master cylinder 20 which supplies the brake pressure to a brake operating mechanism 18 according to a depression of the brake pedal 19 in order to process the above-described selection event.

Figure 2:
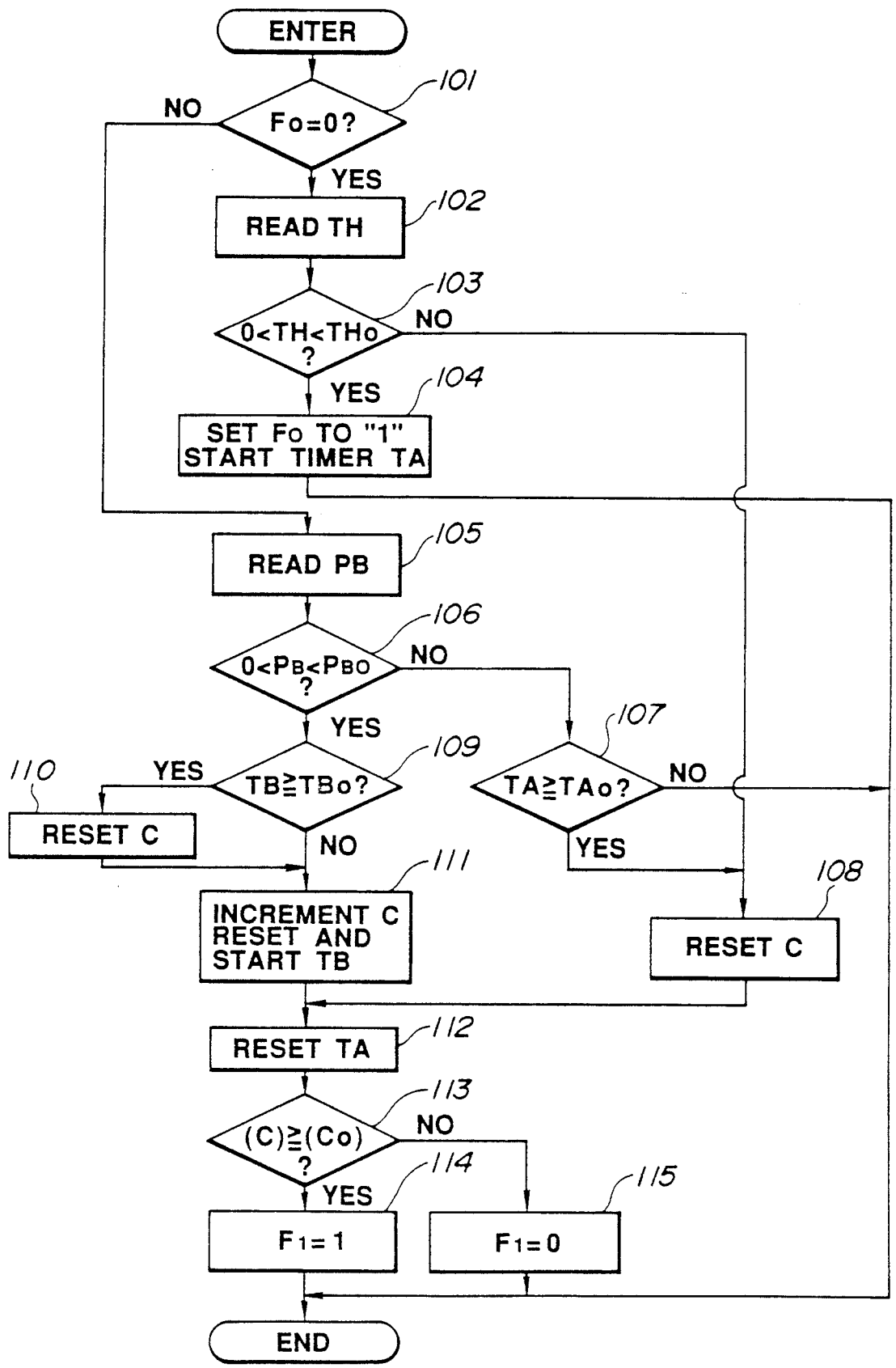
FIG. 2 is an operational flowchart executed in the first preferred embodiment shown in FIG. 1.

At this time, the microcomputer 14 executes a traffic stagnation recognition program shown in FIG. 2 at an extremely short time interval in response to an interrupt command issued at a predetermined period of time.

In a step 102, the CPU of the microcomputer 14 determines whether a slow acceleration flag Fo indicates O (Fo=O), i.e., the slow acceleration is not yet carried out. If Fo=O, the routine goes to a step 102 in which the opening angle TH of the throttle valve is read. Thereafter, the routine goes to the step 103.

In the step 103, the CPU determines whether the slow acceleration occurs from the opening angle TH of the throttle valve. This determination is based on the fact that the opening angle TH of the throttle valve is larger than zero but is less than a predetermined value THo. That is to say, if the opening angle TH of the throttle valve is larger than 0, the vehicle is accelerated.

In addition, when the opening angle TH of the throttle valve is narrower than the predetermined value THo defined as the opening angle when the vehicle cruises at 40 Km/h on a flat road, the vehicle is slowly accelerated. In a case when $0<TH<THo$, the CPU determines that there is a slow acceleration. In a case when $0<TH<THo$, the slow acceleration flag Fo is set to 1 in the next step 104 and a slow acceleration timer TA is started. Thereafter, this program is ended. If not $0<TH<THo$, the routine goes to a step 108 and the counter C as will be described later is reset.

On the other hand, after it has been set in the step 104, since the slow acceleration flag Fo is set to 1 in the step 101, the routine goes to the step 105 to read the brake pressure PB and the routine goes to the step 106.

In the step 106, the CPU determines whether a slow deceleration occurs from the brake pressure PB.

This determination is based on the fact that the brake pressure PB is larger than zero and is smaller than the predetermined value PBo. That is to say, the vehicle is decelerated when the brake pressure PB is larger than 0. In addition, the vehicle is slowly decelerated when the brake pressure is lower than a predetermined value PBo. In the case where $0<pB<PBo$, the CPU determines that the slow deceleration occurs. In a case where $0<PB<PBo$ ($PB \geq PBo$), the routine goes to a step 107 which determines if a value of the slow acceleration timer TA exceeds a predetermined value TAo. If not $TA \geq TAo$, the program ends. On the other hand, if $TA \geq TAo$, the routine goes to a step 108 in which the counter C, which counts the number of repetitions in which the slow accelerations and slow decelerations are alternatingly executed, is reset to 0. Then, the routine goes to the step 112.

In a step 106, the routine goes to a step 109 in which the slow deceleration occurs followed by the slow acceleration if $0<PB<PBo$. In the step 109, the microcomputer determines whether a value of a repetitive timer TB is below the predetermined value TBo. If $TB \geq TBo$, a constant time has passed from a previous slow acceleration and slow deceleration. At this time, since the slow acceleration and/or slow deceleration occurs due to other causes or due to entry of the vehicle into another traffic stagnation, the process goes to a step 110, the counter C is reset and, thereafter, the routine goes to a step 111. If not $TB \geq TBo$, a probability of the traffic stagnation is high due to the alternate repetition of slow acceleration and slow deceleration at the first time or in a short period of time. Therefore, the routine goes to the step 111 in which the counter C is incremented and the slow acceleration flag Fo is reset and the repetitive timer TB is started.

In the next step 112, the slow acceleration flag Fo is reset to zero and the slow acceleration timer TA is reset to 0 to enable the determination of the subsequent slow acceleration.

In the next step 113, the CPU determines whether the value of the counter C exceeds the predetermined number Co (,e.g., 2 through 5). Consequently, if $Co \geq Co$, the microcomputer 14 determines that the vehicle runs in a traffic stagnation since the slow acceleration and slow deceleration are repeated alternatingly and in a short period of time and the routine goes to the step 114 in which a stagnation flag $F_1$ is set to 1. If not $C \geq Co$, the routine goes to the step 112 in which the stagnation flag $F_1$ is set to 0.

The speed change control microcomputer 14 can recognize the run in the traffic stagnation upon the execution of the related program. In addition, the microcomputer 14 selects the speed change diagram started at the second gear position when the vehicle is started which is appropriate to the run in the traffic stagnation during the stagnation flag $F_1$ being at 1.

Hence, in the automatic speed change mechanism 2 described above, the vehicle acceleration with respect to the depression quantity of the accelerator pedal 8 is reduced to facilitate the driving operation, thus reducing the fatigue of the driver.

Since the microcomputer 14 recognizes that if the run in the stagnation pattern is carried out several times, the vehicle runs in the traffic stagnation and its result is reflected in the speed change control, the automatic transmission 2 can respond to the traffic stagnation in a very short period of time.

It is noted that while the stagnation flag $F_1$ is at "1", the driving operation can be facilitated in the same way as described above even if the output of the engine 1 is controlled so as to be reduced at a time of the normal vehicle run.

Figure 3:
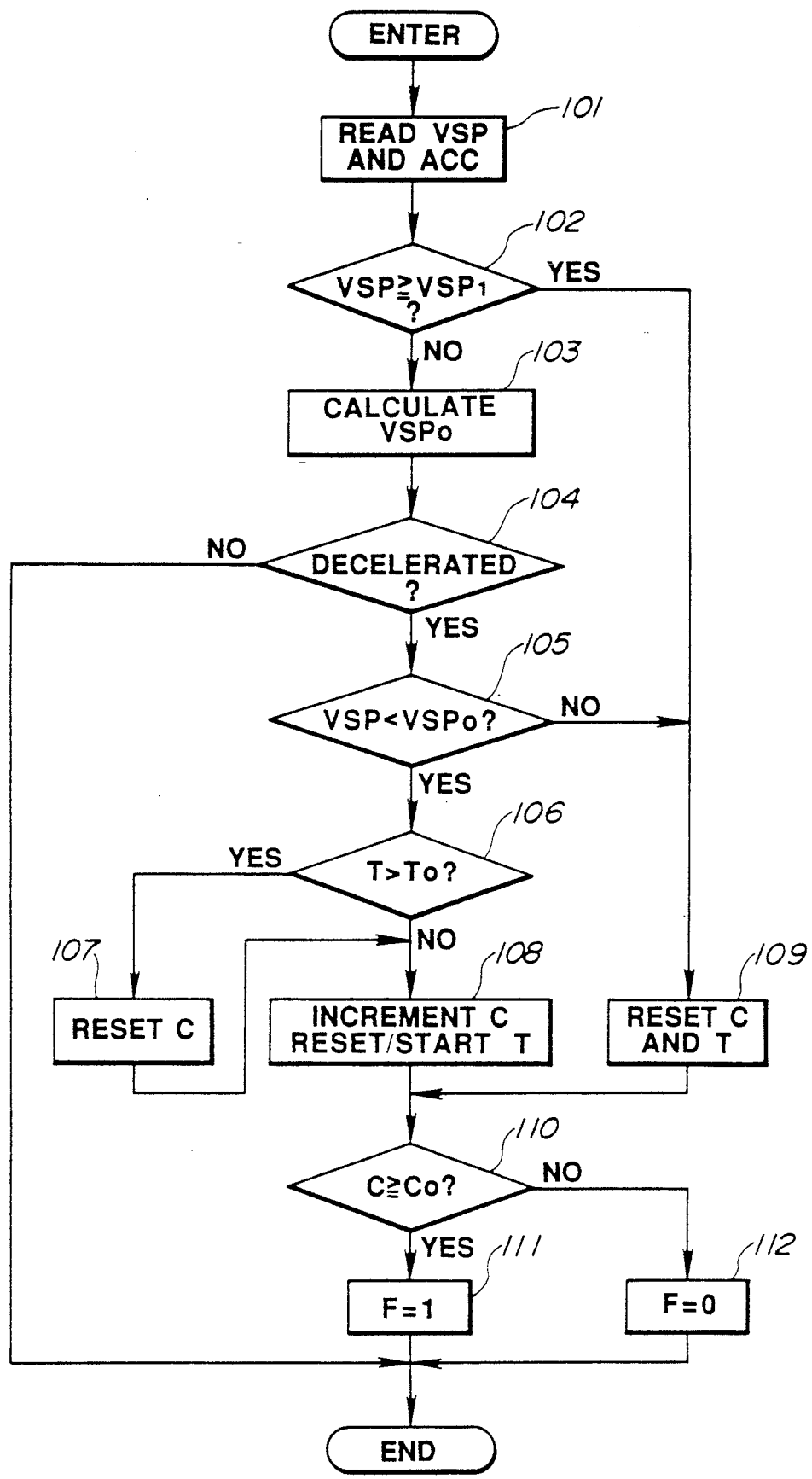
FIG. 3 is another operational flowchart executed in a second preferred embodiment.

FIG. 3 shows a program of a traffic stagnation recognizing system used in a second preferred embodiment according to the present invention.

In the step 101A, the signal from the vehicle speed sensor 7 indicating the vehicle speed VSP is read and the signal from the throttle sensor 11 indicating a depression quantity (operating variable) ACC of the accelerator pedal is read. In the following step 102A, the microcomputer 14 determines whether the vehicle speed VSP is above a predetermined limit vehicle speed $VSP_1$ (,e.g., 40 Km/h) or not. As the result of determination, if not $VSP \geq VSP_1$, i.e., the vehicle runs at a low speed, a probability that the vehicle runs in the stagnation state is high and the routine goes to a step 103A.

In the step 103A, the operating variable ACC of the accelerator pedal (total depression quantity from 0 to the present position) is derived from the accelerator pedal operating variable ACC as an acceleration operating variable quantity of the vehicle. An estimated arrival vehicle speed VSPo is, furthermore, calculated from the accelerator pedal depression quantity.

The calculation of the estimated arrival vehicle speed is carried out using the vehicle running specifications such as the operating variable of the accelerator pedal, weight of the vehicle, and ratio in the speed change range set with the weight of the vehicle and arrival vehicle speed taken into account. The result of an experiment of the actual vehicle is stored as a table or function in the memory 17. A method converting the contents of the table or function can be carried out.

Figure 4:
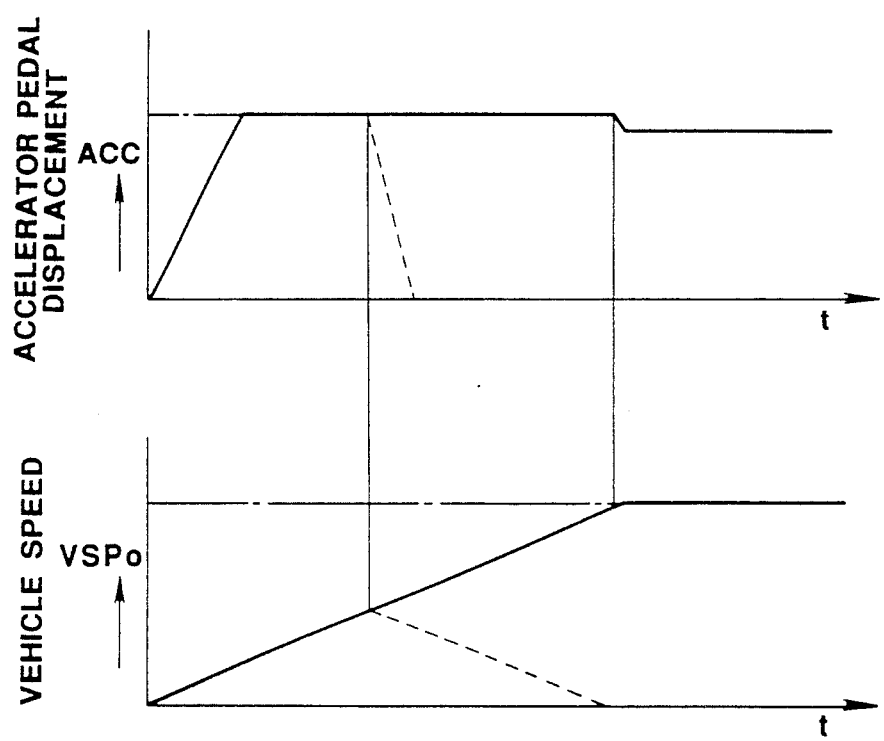
FIGS. 4 (a) and 4 (b) are characteristic patterns of a vehicle run during a vehicle normal run and during the vehicle run in a traffic stagnation.

In the second preferred embodiment, with the running pattern in the case of normal run such that after the vehicle speed is sufficiently raised as shown in solid lines in FIG. 4, the depression angle of the accelerator pedal is slightly returned to enter in the cruise run taken into account, a predetermined coefficient (,e.g., 0.8) which is smaller than 1 is multiplied by the estimated terminal vehicle speed VSPo derived directly from the accelerator pedal operating variable. The estimated terminal vehicle speed VSPo is estimated to a slightly lower value. The value of VSPo is held at a maximum when a returning operation of the accelerator pedal occurs.

In a step 104A, the CPU determines whether a deceleration operation has been carried out. This determination derives the returning operating variable of the accelerator pedal from the accelerator pedal depression quantity ACC. The CPU determines that the deceleration operation is carried out with the returning operating variable of the accelerator pedal derived from the operating variable ACC of the accelerator pedal such that the deceleration has been carried out in at least one of both cases, the first being where the returning operating variable exceeds a degree corresponding to that at be which the vehicle can slowly decelerated and the second being when the brake operation signal BRK is inputted from the brake sensor 21. This program is ended when no deceleration operation is present as the result of the determination. If the deceleration operation is present, the routine goes to a step 105A.

In the step 105A, the microcomputer 14 determines whether or not the vehicle speed VSP is below the above-described estimated arrival vehicle speed VSPo. If VSP<VSPo, the acceleration has been halted, and the deceleration operation has been carried out before the vehicle reaches the estimated arrival vehicle speed VSPo which meets the depression quantity of the accelerator pedal 8. Therefore, the vehicle is in the running pattern encountered in traffic stagnation and the probability of being in traffic stagnation is extremely high. Then, in a step 106A, the microcomputer 14 determines whether or not the value of the timer T exceeds a predetermined value To as will be described later. As the result of determination, if not $T \geq To$, the routine goes to a step 108A. The value of the counter C which counts the number of times the vehicle runs through the traffic stagnation is incremented. Then, the reset and start of the timer to 0 are carried out. When $T \geq To$, the CPU considers that a long period of time has elapsed from the increment of the counter C at a previous period of program due to another cause than the traffic stagnation or next traffic stagnation. Then, after the counter value C is reset to 0 in a step 109A, the routine goes to the step 108.

On the other hand, in a case where $VSP \geq VSP_1$ in the step 102A, the vehicle speed is sufficiently high and the CPU can determine that the vehicle is not running in traffic stagnation. Furthermore, in a case where VSP is not less than $VSP_0$ in the step 105A, the CPU can determine that the vehicle does not run in the traffic stagnation since the vehicle speed is raised up to the estimated arrival vehicle speed. In either of these cases, the routine goes to a step 109 in which both counter C and timer T are reset to 0.

In a step 110A, the CPU determines whether the value of the counter C exceeds a predetermined number Co (,e.g., 2 through 3). Consequently, if $C \geq C_0$, the frequency of generations in the stagnation pattern is high. The CPU determines that the vehicle is in the stagnation state and the routine goes to a step 111A in which the stagnation flag F is set to 0. If not $C \geq Co$ the routine goes to a step 112A in which the stagnation $F_1$ is reset to 0.

When the CPU executes the program, the speed change computer 14 can recognize the run in the traffic stagnation and select the speed change diagram which starts in the second range at the time of the vehicle start and which is appropriate to the run in the traffic stagnation while the stagnation flag F is at a "1".

Hence, the driving operation becomes easier by the acceleration degree being set smaller with respect to the depression quantity of the accelerator pedal 8 according to the automatic transmission 2, and the fatigue of the driver can be reduced.

In addition, since the computer 14 recognizes that the vehicle runs in the traffic stagnation when the runs in the traffic stagnation pattern are twice or third carried out and reflects its results in the speed change control, the automatic transmission 2 can quickly respond to the traffic stagnation in a very short time.

It is noted that when during the stagnation flag F being at a "1" the output of the engine 1 is controlled so as to be reduced as compared with the normal run to facilitate the driving operation in the same way as described above.

The present invention is applicable to a vehicle in which a manual transmission is installed, e.g., when the computer for the traffic stagnation is additionally installed so as to execute the engine output control.

As described hereinabove, since the stagnation recognizing system and method according to the present invention can recognize the characteristic pattern of running described above such that operations to decelerate the vehicle before the vehicle reaches a vehicle speed which correspond to an acceleration operating variable (of the accelerator pedal) are repeatedly and frequently carried out, it is not necessary to collect the data in the running state the traffic stagnation for a long period of time. Hence, the traffic stagnation can be recognized in a very short period of time and its result can be reflected into such as a control for the automatic transmission so that the driver can cope with the traffic stagnation with the fatigue of the driving operations reduced.

It will fully be appreciated by those skilled in the art that the foregoing description is made in terms of the preferred embodiments and various changes and modifications may be made without departing from the scope of the present invention which is to be defined by the appended claims.

What is claimed is:

1. A system for recognizing a traffic stagnation state for a vehicle, comprising:
    first means for deriving a vehicle speed;
    second means for deriving a vehicle acceleration which the vehicle is subjected to;
    third means for deriving a vehicle acceleration which the vehicle is subject to; and
    fourth means for deriving a vehicle running pattern on the basis of the vehicle speed, vehicle acceleration, and vehicle deceleration and determining whether or not the vehicle running pattern derived substantially coincides with a running pattern peculiar to a traffic stagnation state in which the vehicle runs in the traffic stagnation,
    wherein the fourth means includes:
    fifth means for outputting a first signal when a magnitude of the acceleration derived is below a first predetermined value;
    sixth means for outputting a second signal when a magnitude of the acceleration derived is below a second predetermined value; and
    seventh means for determining whether or not a frequency of alternating repetitions of the outputs of the first and second signals exceeds a third predetermined value and recognizing that the vehicle runs in the traffic stagnation state upon determining that the frequency exceeds the third predetermined value.

2. A system as set forth in claim 1, wherein the fifth means reads an opening angle of a throttle value of a vehicular engine and outputs the first signal when the opening angle is above zero but is below the first predetermined value.

3. A system as set forth in claim 2, wherein the first predetermined value is set as the opening angle of the throttle value when the vehicle runs at a predetermined vehicle speed on a flat road.

4. A system as set forth in claim 2, wherein the sixth means reads a brake pressure of a brake master cylinder of the vehicle and outputs the second signal when the brake pressure is above zero but is below the second predetermined value.

5. A system as set forth in claim 4, wherein the second predetermined value is set as the brake pressure when the vehicle runs normally.

6. A system as set forth in claim 4, wherein the fourth means includes a timer which is set in operation in response to the first signal for measuring a time and a counter which is incremented by one when the second signal is outputted before the timer measures a predetermined time, the fourth means outputting a third signal when the counter value reaches the third predetermined value, the third signal indicating the vehicle running in the traffic stagnation state.

7. A system as set forth in claim 6, wherein the third predetermined value is a value between two and five.

8. A system as set forth in claim 6, which further includes eighth means for selecting a speed change diagram of an automatic transmission of the vehicle which starts in a second gear range used in the start of the vehicle when the third signal is indicated by the counter.

9. A system for recognizing a traffic stagnation state for a vehicle, comprising:
    first means for detecting a vehicle speed of the vehicle;
    second means for deriving a vehicle acceleration which the vehicle is subjected to;
    third means for deriving a vehicle deceleration which the vehicle is subject to; and
    fourth means for deriving a vehicle running pattern on the basis of the vehicle speed, vehicle acceleration and vehicle deceleration and determining whether or not the vehicle running pattern derived substantially coincides with a running pattern peculiar to a traffic stagnation state in which the vehicle runs in the traffic stagnation,
    wherein the second means derives an operating variable of an accelerator of the vehicle and wherein the fourth means includes:
    fifth means for deriving an estimated arrival vehicle speed defined as the vehicle speed at which the vehicle speed would arrive according to the operating variable of the accelerator;
    sixth means in response to the presence of the vehicle deceleration derived by the third means for comparing the detected vehicle speed with the estimated arrival vehicle speed and outputting an acceleration halt signal when the detected vehicle speed is below the estimated arrival vehicle speed; and
    seventh means for recognizing that the vehicle runs in the stagnation state when a frequency of the outputted acceleration half signal exceeds a predetermined number.

10. A system as set forth in claim 9, wherein the estimated arrival vehicle speed is derived from the operating variable of a vehicle accelerator pedal as the operating variable of the vehicle acceleration.

11. A System set as set forth in claim 10, wherein the estimated arrival vehicle speed is derived using a weight of the vehicle, an increase/decrease speed change ratio at a speed change range set at the arrival vehicle, and output characteristic of a vehicular engine.

12. A system as set forth in claim 11, wherein the estimated arrival vehicle speed is a predetermined factor multiplied by the estimated arrival vehicle speed directly derived from the operating variable of the accelerator, the predetermined factor being a value less than one.

13. A system as set forth in claim 9, wherein the third means derives the vehicle deceleration on the basis of an operating variable of an accelerator when the accelerator is returned to a non-operation state.

14. A system as set forth in claim 13, wherein the third means derives the vehicle deceleration on the basis of a brake operation of a brake device.

15. A system as set forth in claim 14, wherein the fourth means includes a counter which counts occurrence of the acceleration halt signal within a predetermined time measured by a timer and indicates that the number of inputted acceleration halt signal reaches the predetermined number.

16. A method of recognizing whether a motor vehicle runs in traffic stagnation state or not, the motor vehicle including an engine, an accelerator pedal operatively associated with the engine, and a brake pedal, the method comprising the steps of:
- detecting a variable indicative of a magnitude of depression of the accelerator pedal and generating an accelerator pedal depression signal indicative of said variable detected;
- determining whether said accelerator pedal depression signal is less than a predetermined accelerator pedal depression value or not;
- detecting deceleration demand on the motor vehicle and generating a deceleration demand signal indicative of said deceleration demand detected;
- determining whether deceleration demand signal is less than a predetermined deceleration demand value or not after it has been determined that said accelerator pedal depression signal is less than said predetermined acceleration pedal depression value;
- incrementing a counter when it is determined that said deceleration demand signal is less that said predetermined deceleration demand value after it has been determined that said acceleration pedal depression signal is less than said predetermined acceleration pedal depression value; and
- recognizing that the motor vehicle is in the traffic stagnation state when a content of said counter exceeds a predetermined number.

17. A method of recognizing whether a motor vehicle runs in a traffic stagnation state or not, the motor vehicle including an engine, an accelerator pedal operatively associated with the engine, and a brake pedal, the method comprising the steps of:
- detecting a variable indicative of a magnitude of depression of the accelerator pedal and generating an accelerator pedal depression signal indicative of said variable detected;
- detecting a vehicle speed of the motor vehicle and generating a vehicle speed signal indicative of said vehicle speed detected;
- determining an estimated arrival vehicle speed for said accelerator pedal depression signal;
- detecting a deceleration demand on the motor vehicle and generating a deceleration demand signal indicative of said deceleration demand detected;
- determining whether said deceleration demand signal is generated before said vehicle speed signal arrives at said estimated arrival vehicle speed or not;
- incrementing a counter when it has been determined that said deceleration demand signal is generated before said vehicle speed signal arrives at said estimated arrival vehicle speed; and
- recognizing that the motor vehicle is in the traffic stagnation state when a content of said counter exceeds a predetermined number.

18. A system for recognizing whether a motor vehicle runs in a traffic stagnation state or not, the motor vehicle including an engine, an accelerator pedal operatively associated with the engine, and a brake pedal, the system comprising:
- means for detecting a variable indicative of a magnitude of depressing of the accelerator pedal and generating an accelerator pedal depression signal indicative of said variable detected;
- means for determining whether said accelerator pedal depression signal is less than a predetermined accelerator pedal depression value or not;
- means for detecting a deceleration demand on the motor vehicle and generating a deceleration demand signal indicative of said deceleration demand detected;
- means for determining whether said deceleration demand signal is less than a predetermined deceleration demand value or not after it has been determined that said accelerator pedal depression signal is less than said predetermined acceleration pedal depression value;
- means for incrementing a counter when it is determined that said deceleration demand signal is less that said predetermined deceleration demand value after it has been determined that said acceleration pedal depression signal is less than said predetermined acceleration pedal depression value; and
- means for recognizing that the motor vehicle is in the traffic stagnation state when a content of said counter exceeds a predetermined number.

19. A system for recognizing whether a motor vehicle runs in a traffic stagnation state or not, the motor vehicle including an engine, an accelerator pedal operatively associated with the engine, and a brake pedal, the system comprising:
- means for detecting a variable indicative of a magnitude of depressing of the accelerator pedal and generating an accelerator pedal depression signal indicative of said variable detected;
- means for detecting a vehicle speed of the motor vehicle and generating a vehicle speed signal indicative of said vehicle speed detected;
- means for determining an estimated arrival vehicle speed for said accelerator pedal depression signal;
- means for detecting a deceleration demand on the motor vehicle and generating a deceleration demand signal indicative of said deceleration demand detected;
- means for determining whether said deceleration demand signal is generated before said vehicle speed signal arrives at said estimated arrival vehicle speed or not;
- means for incrementing a counter when it has been determined that said deceleration demand signal is generated before said vehicle speed signal arrives at said estimated arrival vehicle speed; and
- means for recognizing that the motor vehicle is in the traffic stagnation state when a content of said counter exceeds a predetermined number.

* * * * *